United States Patent
Pan et al.

(10) Patent No.: US 8,893,574 B2
(45) Date of Patent: Nov. 25, 2014

(54) BALL SCREW WITH SECTIONAL CIRCULATING ASSEMBLIES

(75) Inventors: Hung-Sung Pan, Taichung (TW); Wen-Chia Wu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 225 days.

(21) Appl. No.: 13/591,227

(22) Filed: Aug. 22, 2012

(65) Prior Publication Data

US 2013/0055839 A1    Mar. 7, 2013

Related U.S. Application Data

(63) Continuation-in-part of application No. 13/225,397, filed on Sep. 2, 2011, now abandoned.

(51) Int. Cl.
*F16H 25/22* (2006.01)

(52) U.S. Cl.
CPC .................................. *F16H 25/2219* (2013.01)
USPC ......................................... 74/424.87; 29/428

(58) Field of Classification Search
USPC ............... 74/424.82, 424.86, 424.87; 29/428, 29/898.06, 898.061, 898.062
See application file for complete search history.

(56) References Cited

U.S. PATENT DOCUMENTS

| | | | | |
|---|---|---|---|---|
| 4,357,838 | A | 11/1982 | Blaurock et al. | |
| 7,810,406 | B2 * | 10/2010 | Chen | 74/424.86 |
| 8,109,169 | B2 * | 2/2012 | Kato et al. | 74/424.87 |
| 8,261,627 | B2 * | 9/2012 | Miyahara et al. | 74/424.86 |
| 2001/0025540 | A1 * | 10/2001 | Greubel | 74/424.87 |
| 2004/0211280 | A1 | 10/2004 | Nishimura et al. | |
| 2005/0126324 | A1 * | 6/2005 | Yang et al. | 74/424.86 |
| 2007/0186708 | A1 * | 8/2007 | Liao et al. | 74/424.86 |
| 2011/0154926 | A1 * | 6/2011 | Lee | 74/424.86 |

* cited by examiner

*Primary Examiner* — Troy Chambers
*Assistant Examiner* — Emily Cheng
(74) *Attorney, Agent, or Firm* — Banger Shia (57) ABSTRACT

A ball screw with sectional circulating assemblies comprises an inner circulating block and an outer circulating block. In assembly, the inner circulating block is initially placed between the screw shaft and the nut before the rolling balls and the screw shaft are positioned, thus preventing the rolling balls from dropping out and the interference with the threads of the screw shaft. After the rolling balls and the screw shaft are positioned, the outer circulating block is placed into the nut and engaged with the inner circulating block, and the outer circulating block is fixed to the nut. This method can maintain the tightness of the nut, thus preventing the leakage of noise.

1 Claim, 14 Drawing Sheets

BALL SCREW WITH SECTIONAL CIRCULATING ASSEMBLIES

This application is a continuation in part of U.S. patent application Ser. No. 13/225,397, which claims the benefit of the earlier filing date of Sep. 2, 2011 now abandoned. Claim 1 of this application is revised from claim 1 of the U.S. patent application Ser. No. 13/225,397, and claim 2 of this application is new.

BACKGROUND OF THE INVENTION

1. Field of the Invention

The present invention relates to a ball screw, and more particularly to a ball screw with sectional circulating assemblies, which can be easily assembled and produces less noise.

2. Description of the Prior Art

Nowadays, ball screw is used more and more widely in modern industries. As a linear transmission means, the ball screw not only has high precision but also has the advantages of low frictional loss, high energy conversion ratio, low noise and high rigidity. Hence, it is self-evident that the ball screw is very important to various industrial mechanisms. In order for the rolling balls between the screw shaft and the nut to circulate smoothly and for relieving the stress therebetween, the nut is usually provided at both ends thereof with two circulation cassettes for cooperating with the threads of the screw shaft and the rolling balls. And the circulation cassette is a key structure for enabling the rolling balls circulation from the screw shaft and the nut. Therefore, how to develop an improved and competitive circulation cassette is the common goal that the manufactures are striving for.

Figure 1:
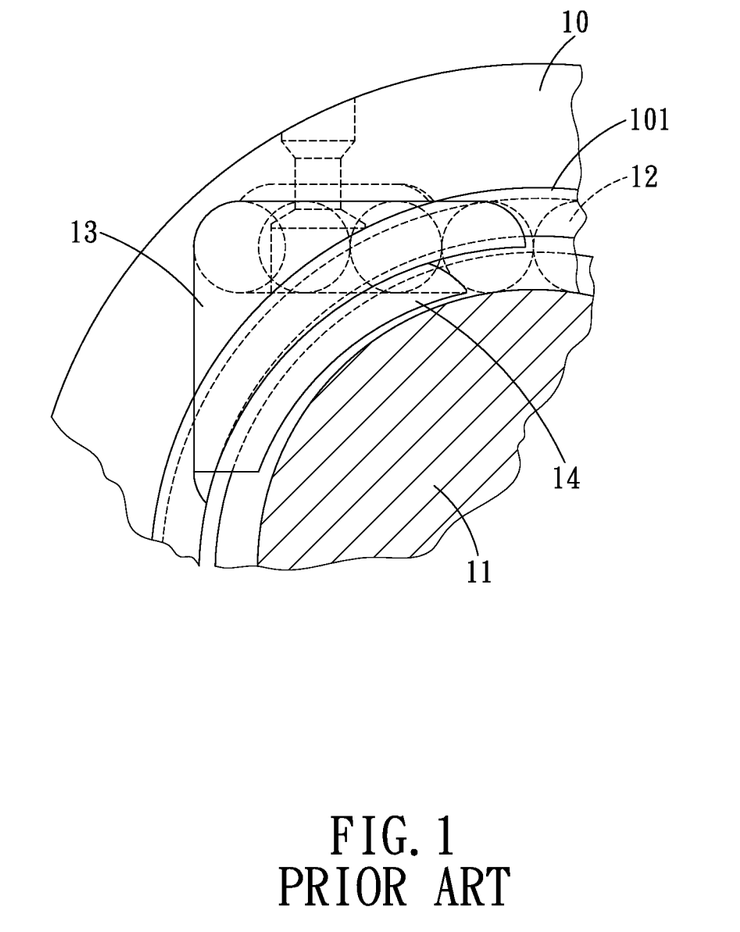
FIG. 1 is an illustrative view of a circulating assembly for a ball screw as disclosed in U.S. Pat. No. 4,357,838.

The conventional circulating assemblies are essentially classified by way of assembly into two categories: axial assembly (as shown in FIG. 1), and radial assembly (not shown). Please refer to the following detailed description:

Axial Assembly:

FIG. 1 shows a ball screw of axial assembly type disclosed in U.S. Pat. No. 4,357,838, which comprises: a nut 10, a screw shaft 11, a plurality of rolling balls 12 and a circulating element 13. The circulating element 13 is installed into the end surface of the nut 10 for guiding the rolling balls 12 into the circulation hole (not shown) of the nut 10. A very important portion of the circulating element 13 is called nail portion 14 that straddles the threads of the nut 10 for smoothly jointing the helical grooves. This axial assembly has the following disadvantages:

First, although this circulating element 13 has the advantages of smooth rolling path and high rotation speed, since the nail portion 14 is engaged in the helical groove 101 of the screw shaft 11, any end of the helical groove 101 must be open so as to facilitate the installation of the nail portion 14 of the circulating element 13. In other words, the helical groove must extends to the shoulder portion of the screw shaft 11, and the helical groove leaves a notch in the in the abutting surface of the shoulder portion, as a result, the integrality of the diameter of the abutting surface is damaged (the outer periphery of the abutting surface is not round). When both ends of the screw shaft 11 are mounted on bearing seats of a machine (not shown), and the motor of the machine starts to rotate the screw shaft 11, the rotation inertia will effect an axial load on both ends of the screw shaft 11. And due to the integrality of the diameter of the abutting surface is damaged, the axial load cannot be evenly distributed on the both ends of the screw shaft 11. This will generate great pressure against the end surface (not shown) of the bearing seats, causing damage to the bearing seats, as a result of that, the screw shaft 11 will be deformed during rotation, adversely affecting the circulation of the rolling balls, but will reduce the service life of the screw shaft. Therefore, it is uneconomical.

Second, the screw shaft 11 is initially inserted at a proper position in the nut 10, and the rolling balls 12 are placed therebetween, and finally the circulating element 13 should be installed at an appropriate angle, otherwise it can be assembled. Therefore, the assembly of the circulating element 13 is complicated and requires a skilled worker.

Third, when both ends of the screw shaft 11 are mounted on bearing seats of a machine, the screw shaft 11 is then inserted through the nut 10 and filling rolling balls, the ball screw is assembled by hand. The ball screw probably needs to be subjected to adjustment process (the respective components of the ball screw should be adjusted) during assembly, because of the adjustment process, the rolling balls may drop out of the ball screw when the nut 10 is disengaged from the screw shaft 11 or when the nut 10 moves out of travel.

Radial Assembly:

To overcome the abovementioned problems, another radial assembly was developed, wherein a radial hole is defined in the nut for passage and installation of the circulating element during assembly. Although it can overcome the interference between the nail portion of the conventional circulating element and the helical groove of the screw shaft, this radial assembly still has other problems:

First, the radial hole of the nut breaks the tightness of the nut, sot that the vibration noise generated during the rolling motion of the rolling balls will rush out without reserve.

Second, the radial hole assembled circulating element is so stable as the axially assembled circulating element and is more likely to loosen, and even worse, it will damage the ball screw structure.

Figure 2:
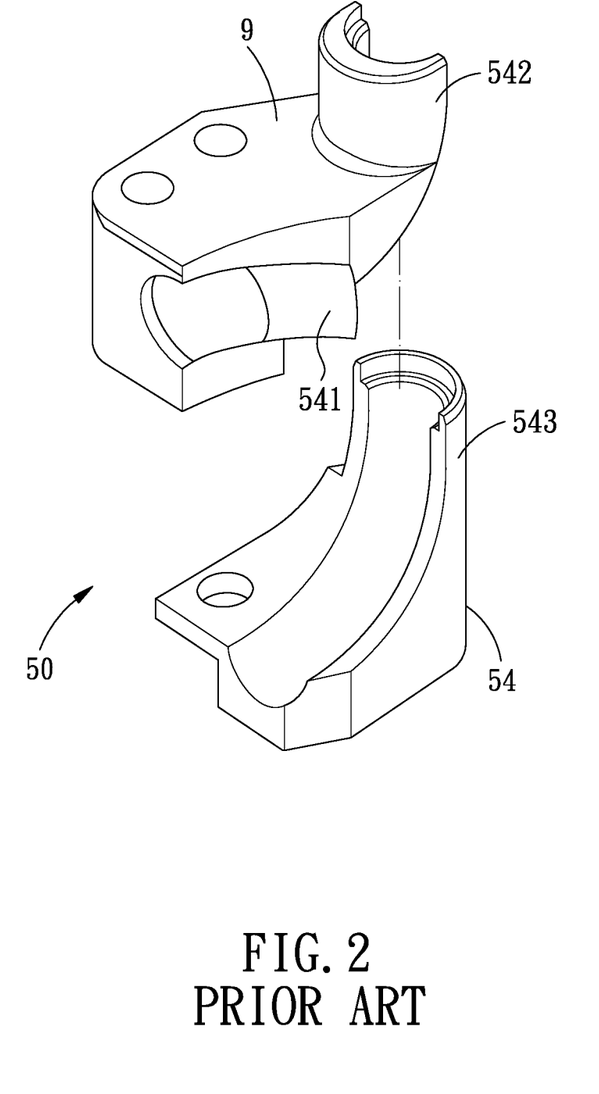
FIG. 2 is an exploded view of a circulating assembly for a ball screw disclosed in U.S Pub. No. 2004/0211280.
Figure 3:
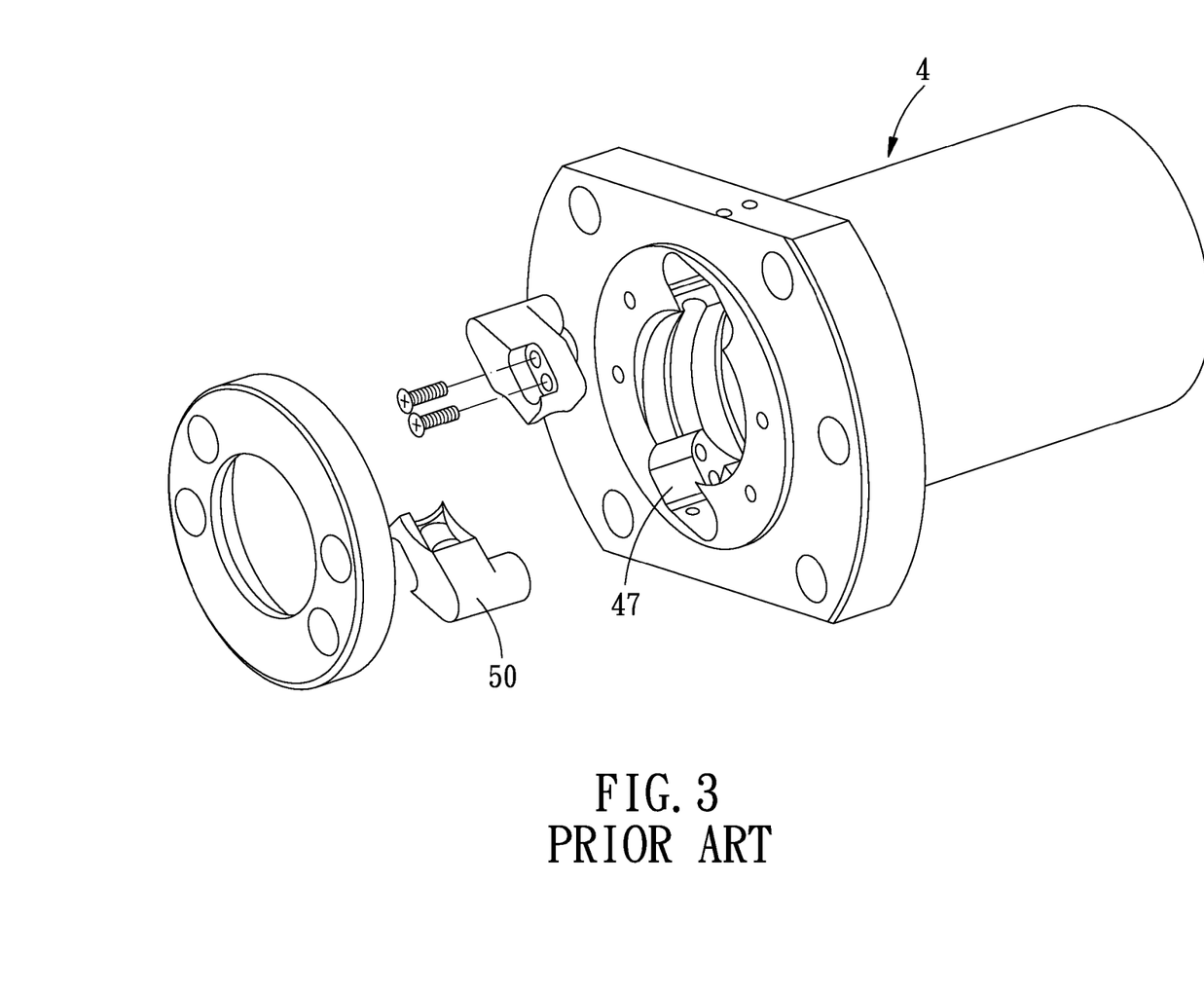
FIG. 3 is an exploded view of the circulating assembly and a nut disclosed in U.S Pub. No. 2004/0211280.

FIGS. 2 and 3 show a ball screw of axial assembly type disclosed in US Pub. No. 2004/0211280 (Nishimura) discloses a ball screw with a circulating assembly 50, wherein the circulating assembly 50 includes an inner circulating block 9 and an outer circulating block 54. The inner circulating block 9 is provided with a nail portion 541 and a semicircular connecting portion 542 protruding out of the inner circulating block 9. The outer circulating block 54 is also formed with a semicircular connecting portion 543 which cooperates with the semicircular connecting portion 542 to form a protruding circular connecting portion to be inserted in the circulating hole of the nut. The problem of Nishimura is that when the inner circulating block 9 is engaged in a recess 47 of the nut 4, the semicircular connecting portion 542 will simultaneously be inserted in the circulating hole of the nut 4, and the semicircular connecting portion 542 is not movable in a radial direction but only movable in an axial direction with respect to the circulating hole of the nut 4, which will stop the inner circulating block 9 from a radial movement with respect to the nut 4, namely, the inner circulating block 9 is not adjustable in a radial direction with respect to the nut 4 when assembled in the recess 47 of the nut 4. Hence, in assembly, the nail portion 541 of the inner circulating block 9 will interfere with the screw shaft, and as a result, the structure of the circulating assembly 50 of Nishimura is only applicable to the ball screw whose helical groove extends to the shoulder portion thereof.

The present invention has arisen to mitigate and/or obviate the afore-described disadvantages.

SUMMARY OF THE INVENTION

The primary object of the present invention is to provide a ball screw with sectional circulating assemblies, wherein the helical groove doesn't need to extend to the shoulder portion of the screw shaft, so that future maintenance or repair can be performed without removing the screw shaft or the nut.

To achieve the object, a ball screw with sectional circulating assemblies in accordance with the present invention comprises: an inner circulating block and an outer circulating block.

In assembly, the inner circulating block is initially placed between the screw shaft and the nut before the balls and the screw shaft are positioned, so as to prevent the balls from dropping out and interfering with the threads of the screw shaft. After the balls and the screw shaft are positioned, the outer circulating block is placed into the nut and engaged with the inner circulating block, and the outer circulating block is fixed to the nut. Hence, by following the above steps can prevent the rolling balls from dropping out and interfering with the threads.

The secondary object of the present invention is to provide an easily assembled, stably positioned and low noise ball screw with sectional circulating assemblies.

Unlike the conventional circulating element that it must deal with the problem of the nail portion's interference during assembly, the circulating assembly of the present invention uses its sectional structure to solve the problem of space interference, effectively simplifying the assembly process and time. In addition, the sectional circulating assembly is engaged with the screw shaft, and is fixed to the nut by a locking member. This method can fix the circulating assembly more stably and can maintain the tightness of the nut, thus preventing the leakage of noise.

The ball screw with sectional circulating assemblies can be easily assembled due to the fact that each of the sectional circulating assemblies consists of an inner circulating block and an outer circulating block. The inner circulating block is H1 in height, W1 in width, and L1 in length, each of the outer circulating blocks is H2 in height, and W2 in width, and L2 in length, the rolling balls have a diameter D, the recesses each have a length L3 and a height H3, and they satisfy the relations: $H1<H2$; $L1<L2$; $W1<W2$; $L1<$ or $=L3-D/2$, and $D<H1<0.9H3$.

In addition to the abovementioned structural features, the ball screw with sectional circulating assemblies in accordance with the present invention can give a remarkable effect only when assembled by following the following steps:

inserting the screw shaft through the inserting hole of the nut or sleeving the nut onto the screw shaft, so as to form the two assembling spaces between the nut and the screw shaft, and the two assembling spaces include a first assembling space and a second assembling space;

inserting the nail portion of a first one of the circulating assemblies into the helical groove of the screw shaft, and keeping the concerned circulating assembly located at the outer peripheral surface of the screw shaft, then moving the nut in the axial direction until the first one of the circulating assemblies gets into the first assembling space;

moving the inner circulating block a second one of the circulating assemblies along the axial direction into the second assembling space, at this moment, the nail portion of the inner circulating block of the second one of the circulating assemblies is located toward the outer peripheral surface of the screw shaft, then moving the inner circulating block of the second one of the circulating assemblies in the radial direction to make the nail portion insert into the helical groove of the screw shaft, and make the first half guideway of the nail portion has an end connected to the circulating hole of the nut;

feeding the rolling balls into the circulating hole until the load path is full of the rolling balls; and moving the outer circulating block of the second one of the circulating assemblies in the axial direction until it inserts into the second assembling space, pushing the first fixing portion of the second one of the circulating assemblies in the axial direction until it inserts in the second fixing portion of the inner circulating block of the second one of the circulating assemblies, the end of the first half guideway of the first circulating assembly is overlapped with the end of the second half guideway of the first circulating assembly, and the end of the first half guideway of the second circulating assembly is overlapped with the end of the second half guideway of the second circulating assembly.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 4-13, a ball screw with sectional circulating assemblies in accordance with a first embodiment of the present invention is illustrated and comprises: a nut 20, a screw shaft 30, two circulating assemblies 40 and a plurality of rolling balls 60.

Figure 4:
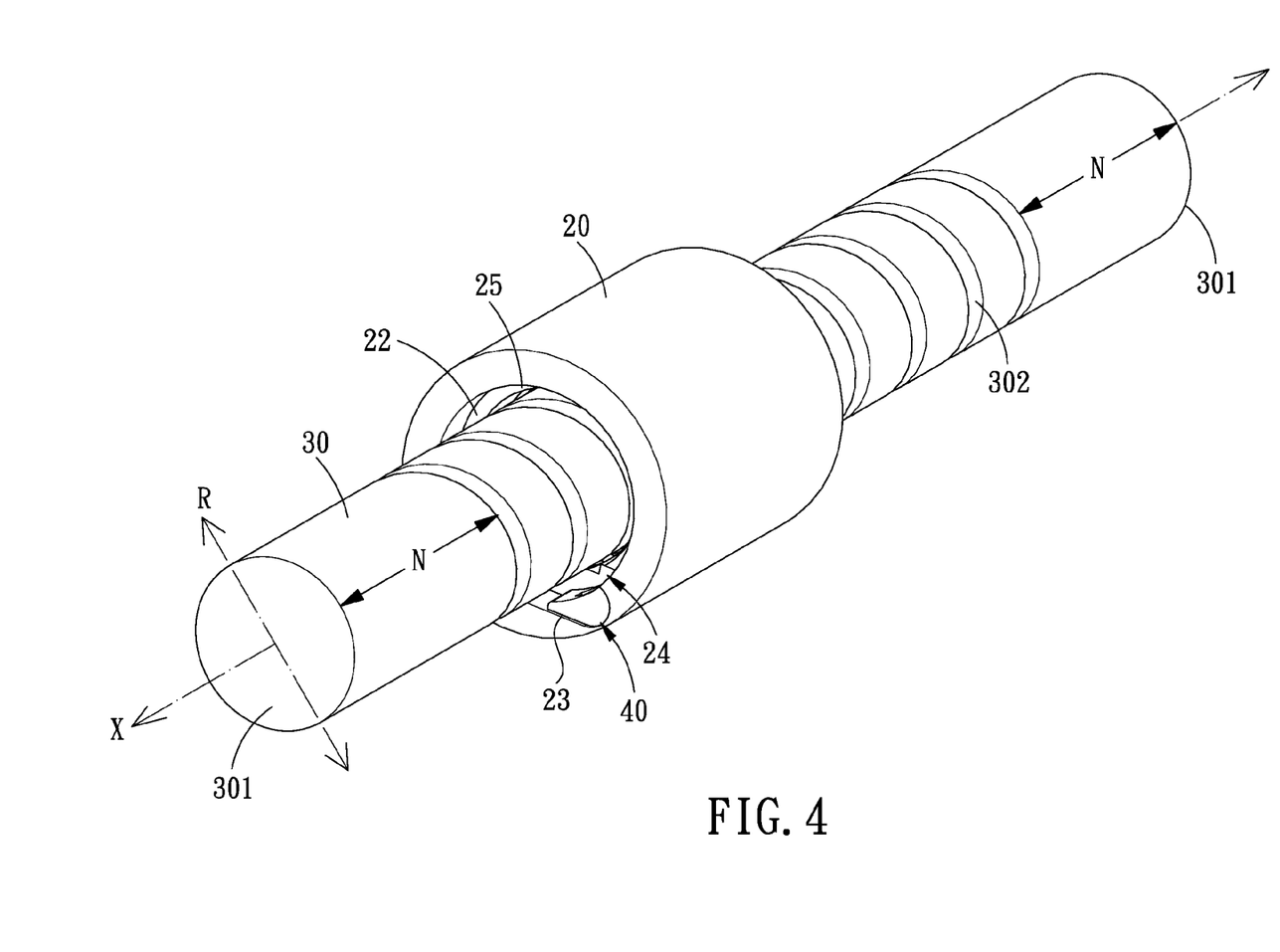
FIG. 4 is an assembly view of a ball screw with sectional circulating assemblies in accordance with a first embodiment of the present invention.
Figure 6:
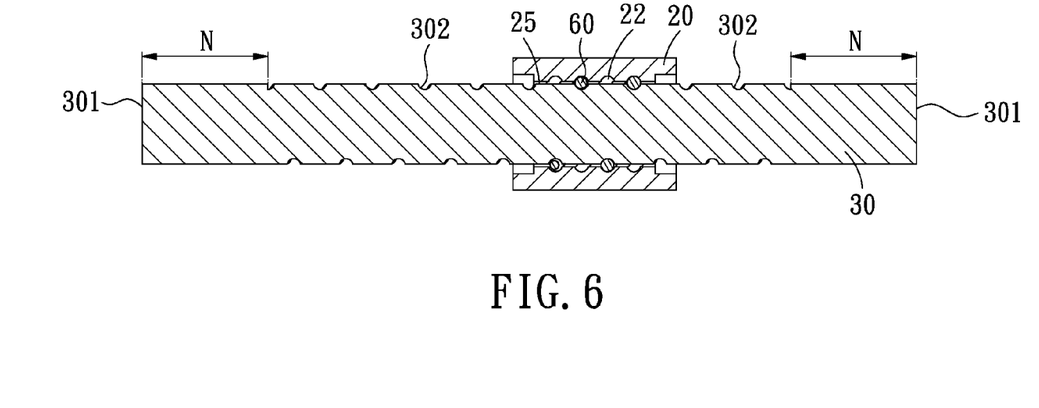
FIG. 6 is a cross sectional view taken along the line 6-6 of FIG. 5.

The screw shaft 30 is an elongated structure extending in a direction, the direction in which the screw shaft 30 extends is defined as an axial direction X, and a direction normal to the axial direction X is defined as a radial direction R. The screw shaft 30 is provided with two axial end surfaces 301 and an outer peripheral surface between the two axial end surfaces 301. The outer peripheral surface of the screw shaft 30 is formed with a helical groove 302, and both ends of the helical groove 302 are located a distance N away from the corresponding axial end surfaces 301, as shown in FIGS. 4 and 6.

Figure 5:
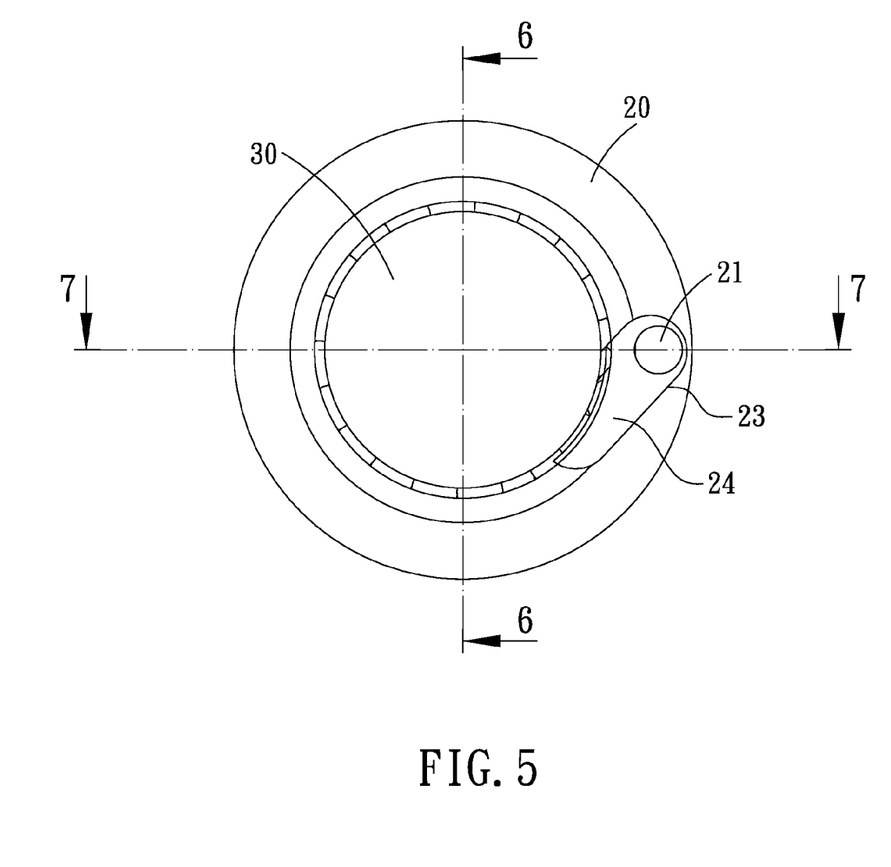
FIG. 5 is a cross sectional view of the ball screw with sectional circulating assemblies in accordance with the first embodiment of the present invention.
Figure 7:
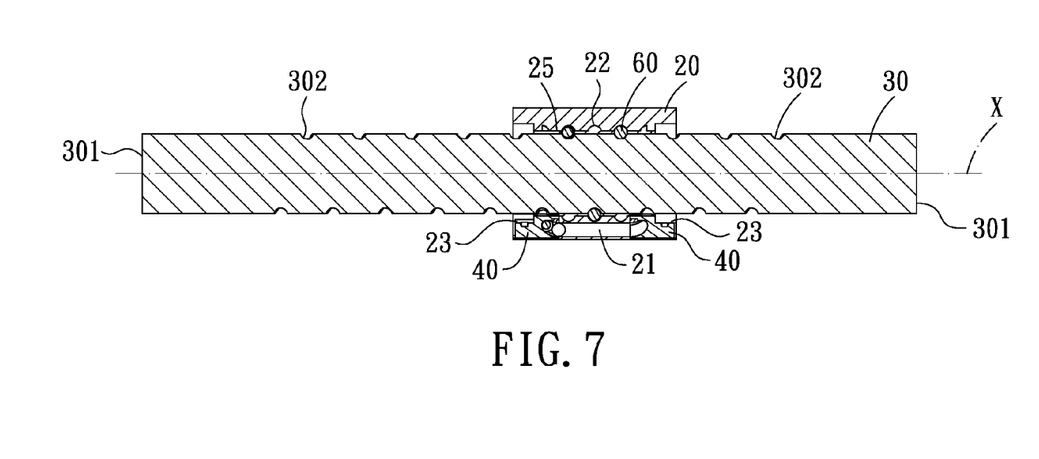
FIG. 7 is a cross sectional view taken along the line 7-7 of FIG. 5.
Figure 8:
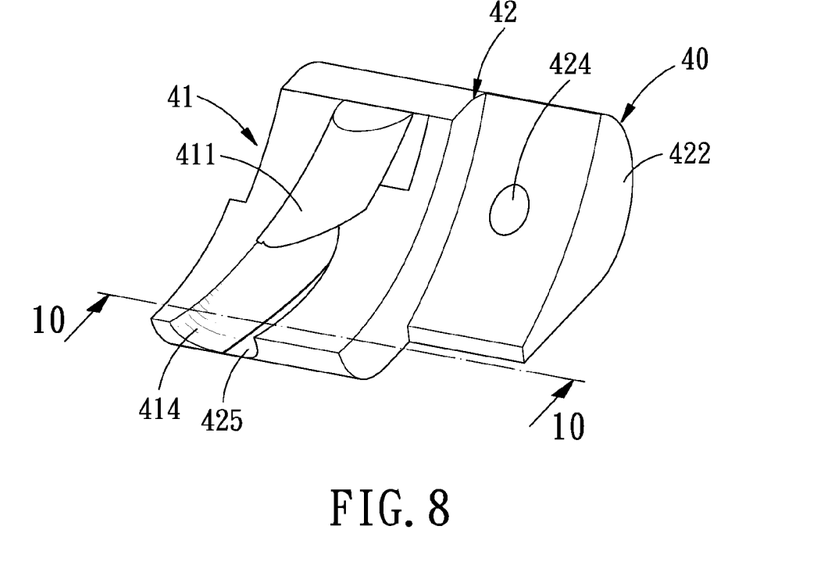
FIG. 8 is an assembly view of a circulating assembly in accordance with the first embodiment of the present invention.

The nut 20 is formed with an inserting hole 25 for insertion of the screw shaft 30. In an inner surface of the inserting hole 25 is formed a helical groove 22 which cooperates with the helical groove 302 of the screw shaft 30 to define a load path. The nut 20 is further provided with a circulating hole 21 extending in the axial direction X (as shown in FIGS. 5 and 7), and at each of two ends of the circulating hole 21 is formed a recess 23 which defines an assembling space 24 with respect to the outer peripheral surface of the screw shaft 30.

Figure 9:
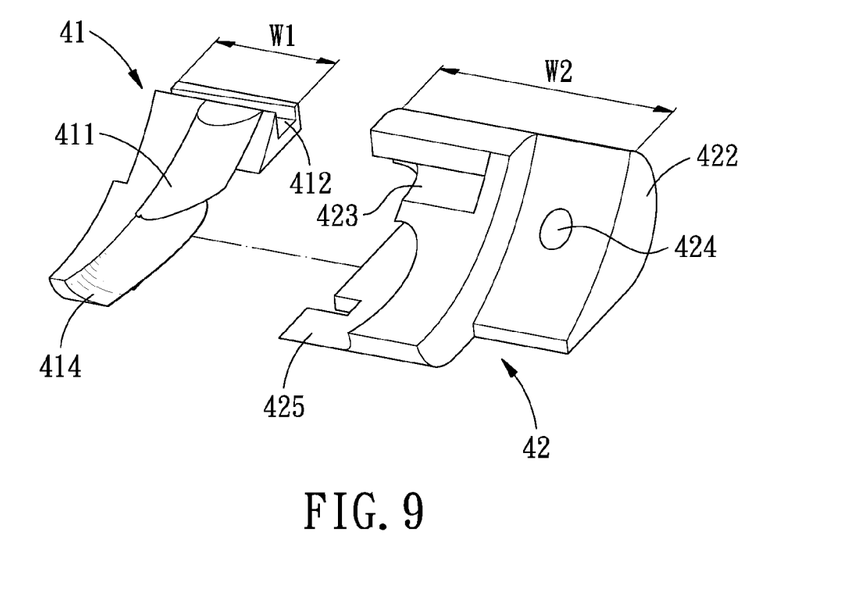
FIG. 9 is an exploded view of the circulating assembly in accordance with the first embodiment of the present invention.
Figure 11:
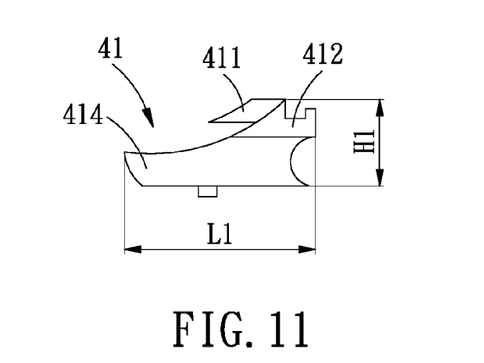
FIG. 11 is a side view of an inner circulating block of the circulating assembly in accordance with the present invention.
Figure 12:
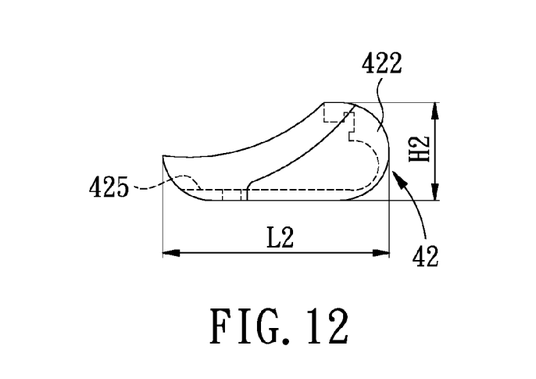
FIG. 12 is a side view of an outer circulating block of the circulating assembly in accordance with the present invention.

The two circulating assemblies 40 are received in the two recesses 23 and each include an inner circulating block 41 and an outer circulating block 42. Each of the inner circulating block 41 includes a nail portion 411, a first half guideway 414 open in the axial direction X, and a second fixing portion 412 extending in the axial direction X. The first half guideway 414 is L-shaped. As shown in FIGS. 9 and 11, the inner circulating block 41 is H1 in height, W1 in width, and L1 in length. Each of the outer circulating blocks 42 includes a second half guideway 425 and a first fixing portion 423 extending in the axial direction X. The second half guideway 425 is L-shaped, as shown in FIGS. 9 and 12, and each of the outer circulating blocks 42 is H2 in height, W2 in width, and L2 in length.

Figure 10:
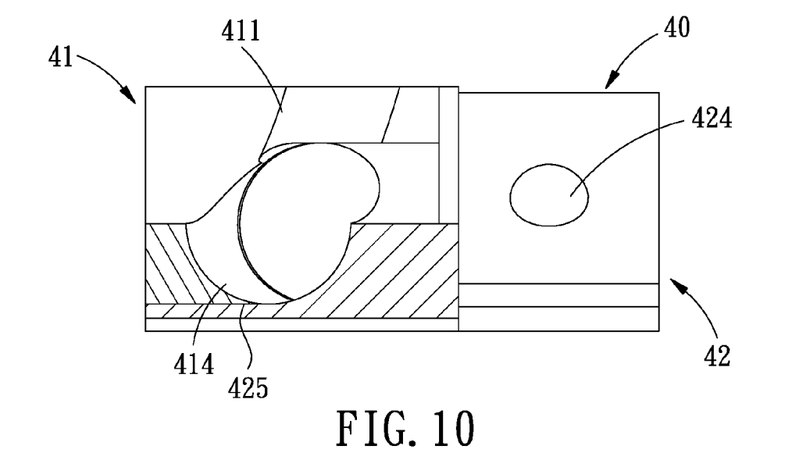
FIG. 10 is a cross sectional view of the circulating assembly taken along the line 10-10 of FIG. 8.

H1<H2, L1<L2, and W1<W2. After being put in the corresponding assembling spaces 24, the inner circulating blocks 41 are pushed to move in the radial direction R to make the nail portions 411 received in the helical groove 302 of the screw shaft 30 in such a manner that the first half guideway 414 of each of the nail portions 411 has one end connected to the circulating hole 21 of the nut 20. After that, the first fixing portion 423 of each of the outer circulating blocks 42 is pushed in the axial direction X to insert in the second fixing portion 412 of each of the inner circulating blocks 41, so as to secure the outer circulating blocks 42 to the inner circulating blocks 41 to form the circulating assemblies 40. As shown in FIG. 10, another end of the first half guideway 414 of each of the nail portions 411 is overlapped with one end of each of the second half guideways 425, and each of the first half guideways 414 cooperates with a corresponding one of the second half guideways 425 to form a circulating passage. It is to be noted that the circulating passage of each of the two circulating assemblies 40 has one end connected to two ends of the circulating hole 21 of the nut 20, and has another end connected to two ends of the load path, so as to form a circulating path in which being disposed the rolling balls 60.

Figure 13:
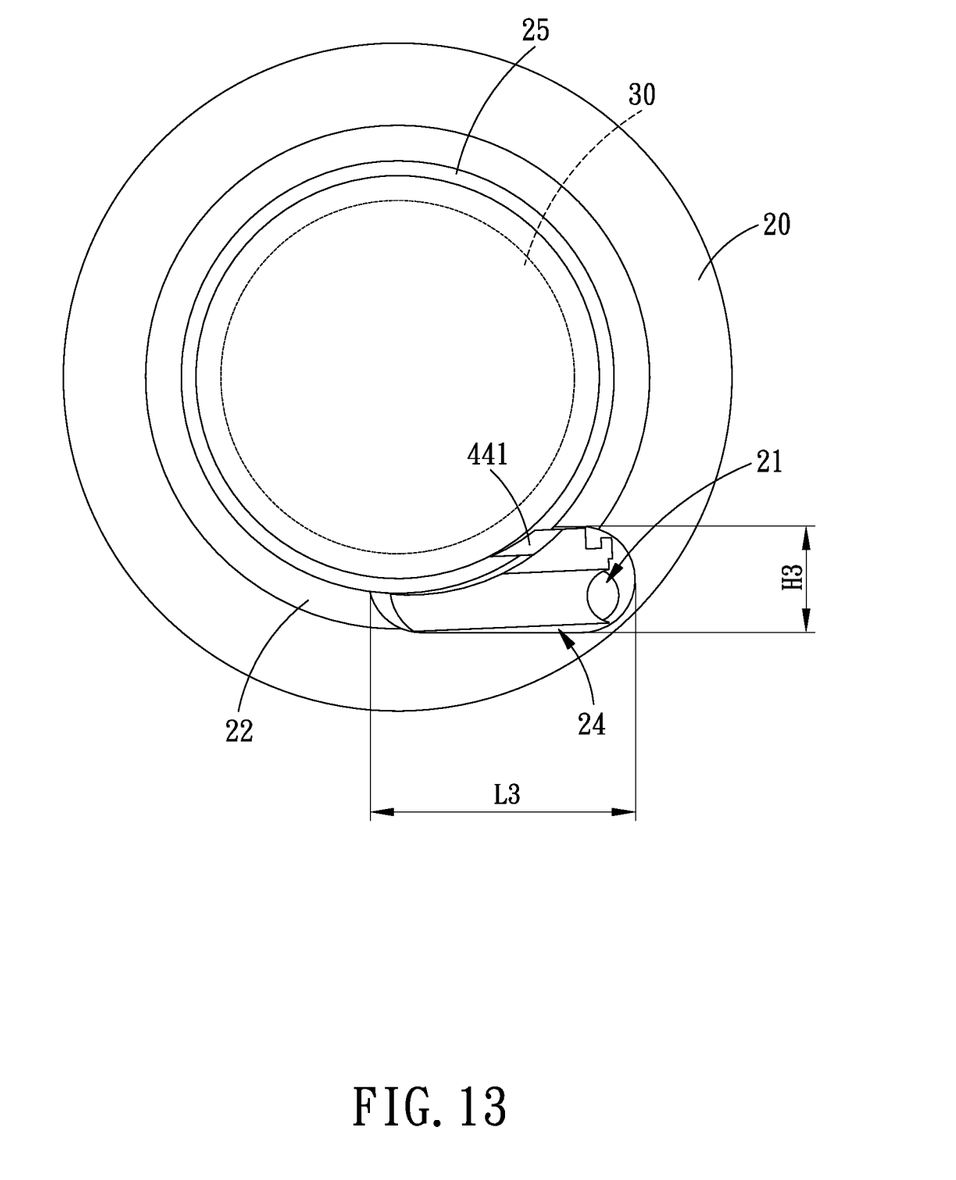
FIG. 13 is a side view of a nut and the recess of the circulating assembly in accordance with the first embodiment of the present invention.

The rolling balls 60 have a diameter D, as shown in FIG. 13, the recesses 23 have a length L3 and a height H3, and the inner circulating block 41 is H1 in height and L1 in length, they satisfy the relations: L1<or =L3-D/2, and D<H1<0.9H3.

The outer circulating block 42 is further integrally formed with a protruding ear 422 and a locking hole 424 defined in the protruding ear 422 to fix the protruding ear 422 to the nut 20 by the use of a locking member (not shown) inserted through the locking hole 424, so that the circulating assembly 40 can be positioned in the recess 23 of the nut 20 firmly.

Figure 14:
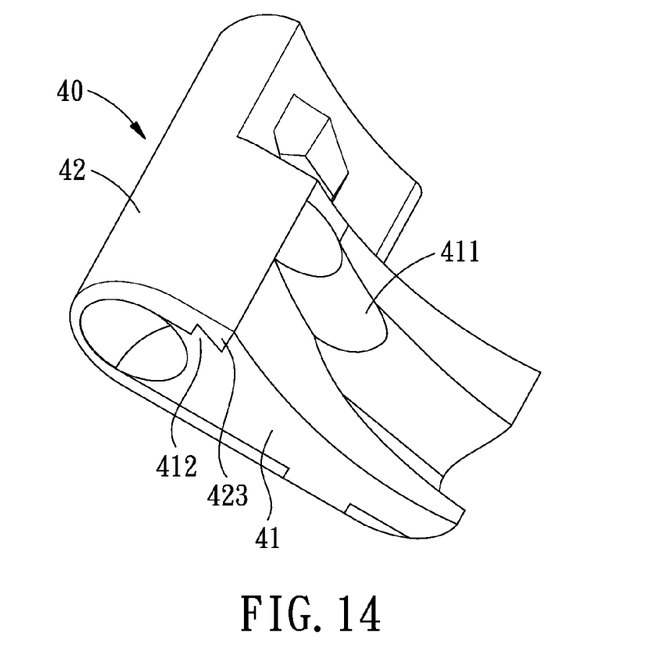
FIG. 14 is a perspective view of a circulating assembly in accordance with another embodiment of the present invention.
Figure 15:
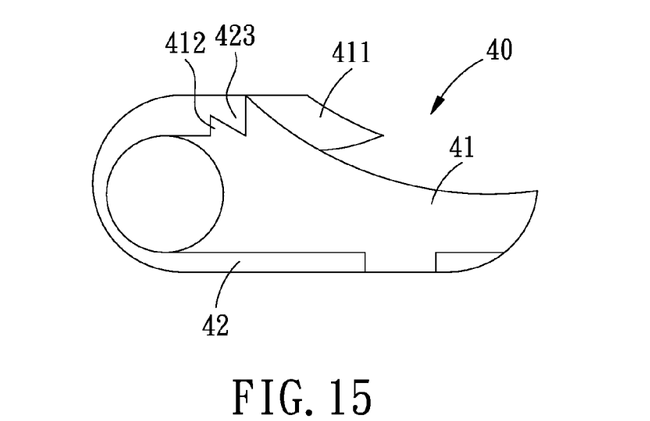
FIG. 15 is a cross sectional view of a circulating assembly in accordance with another embodiment of the present invention.

Referring to FIGS. 14 and 15, which show a second embodiment of the circulating assembly of the present invention, wherein the second fixing portion 412 of the inner circulating block 41 is engaged with the first fixing portion 423 of the outer circulating block 42 by the use of angular grooves. This simply is a structural design variation, the circulating assembly of the second embodiment is still functionally the same as that of the first embodiment.

Figure 16:
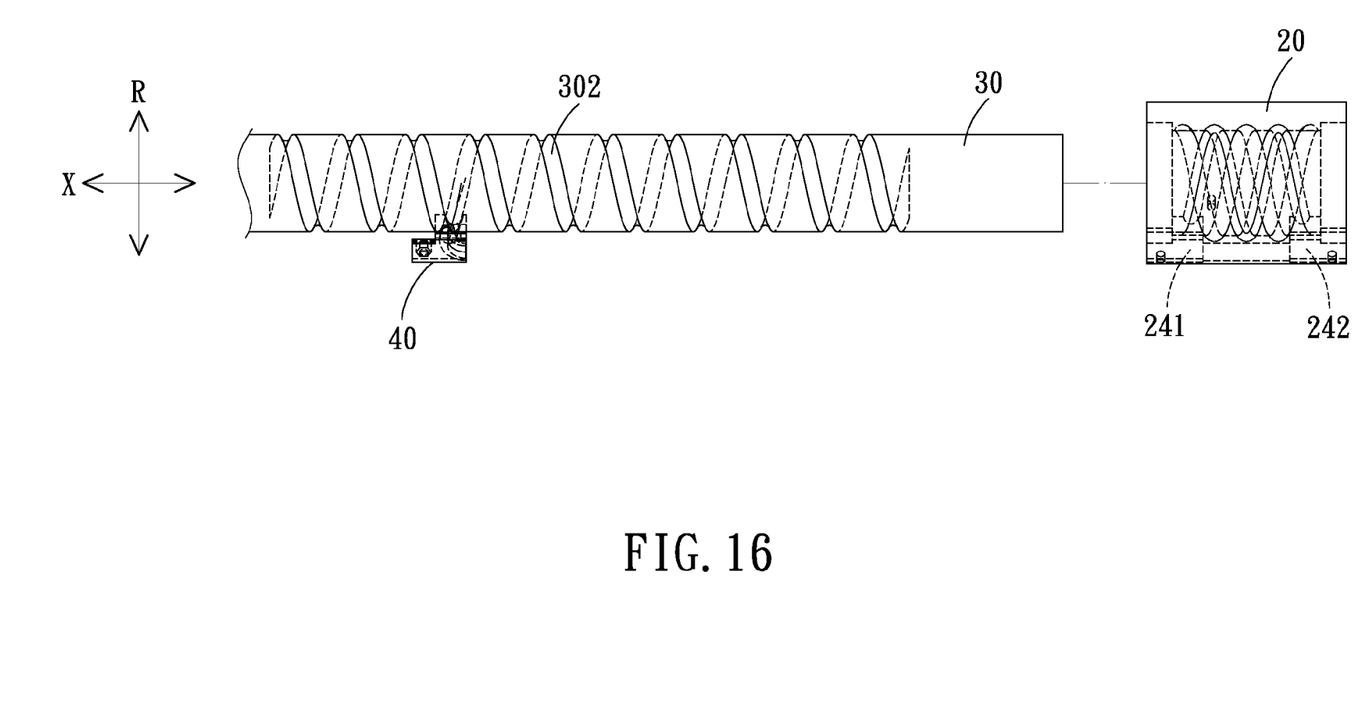
FIG. 16 is an exploded view of the ball screw with sectional circulating assemblies in accordance with the present invention.
Figure 17:
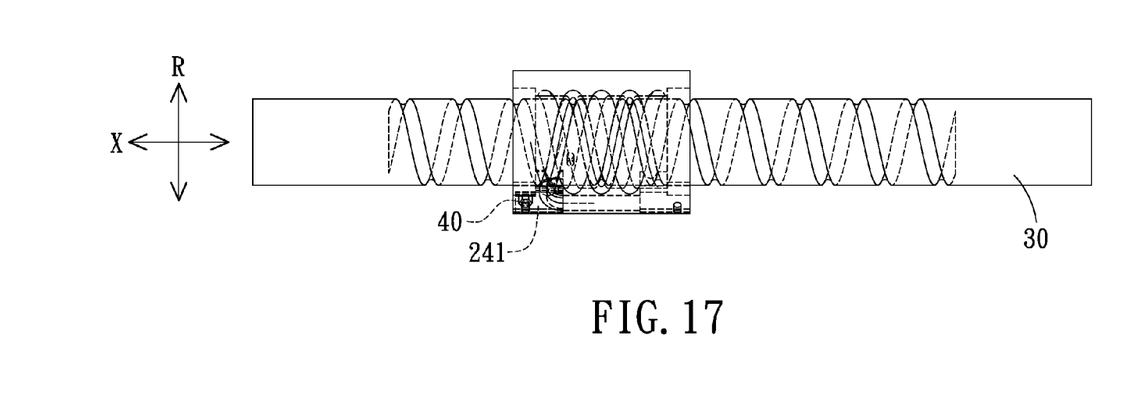
FIG. 17 is a perspective view showing that one of the circulating assemblies has been assembled in the ball screw in accordance with the present invention.
Figure 18:
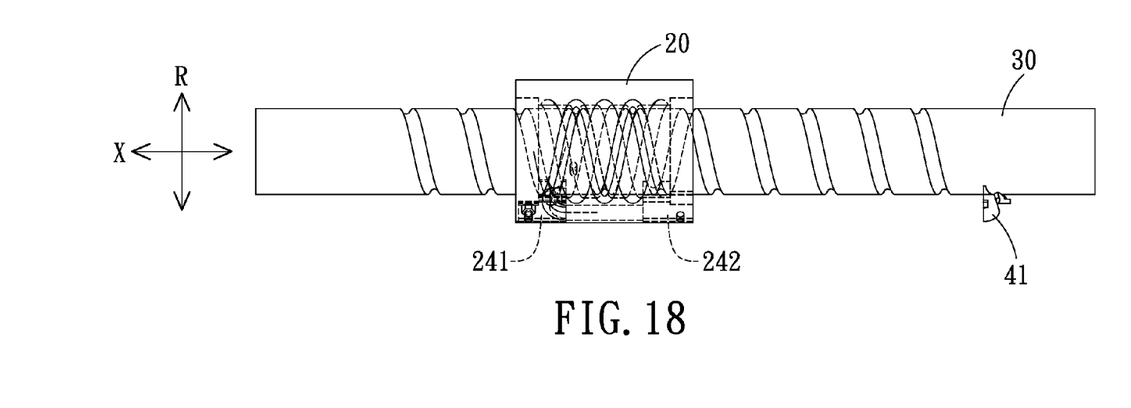
FIG. 18 is a perspective view showing that the inner circulating block of another one of the circulating assemblies is being assembled in the ball screw in accordance with the present invention.
Figure 19:
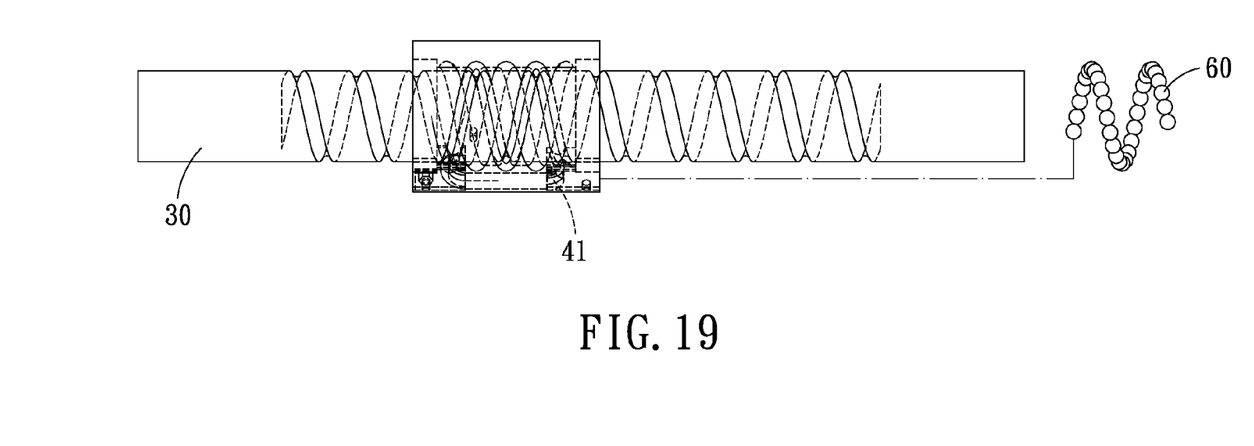
FIG. 19 is a perspective showing that the rolling balls are being assembled in the ball screw in accordance with the present invention after the inner circulating block of the another one of the circulating assemblies has been assembled as shown in FIG. 18.
Figure 20:
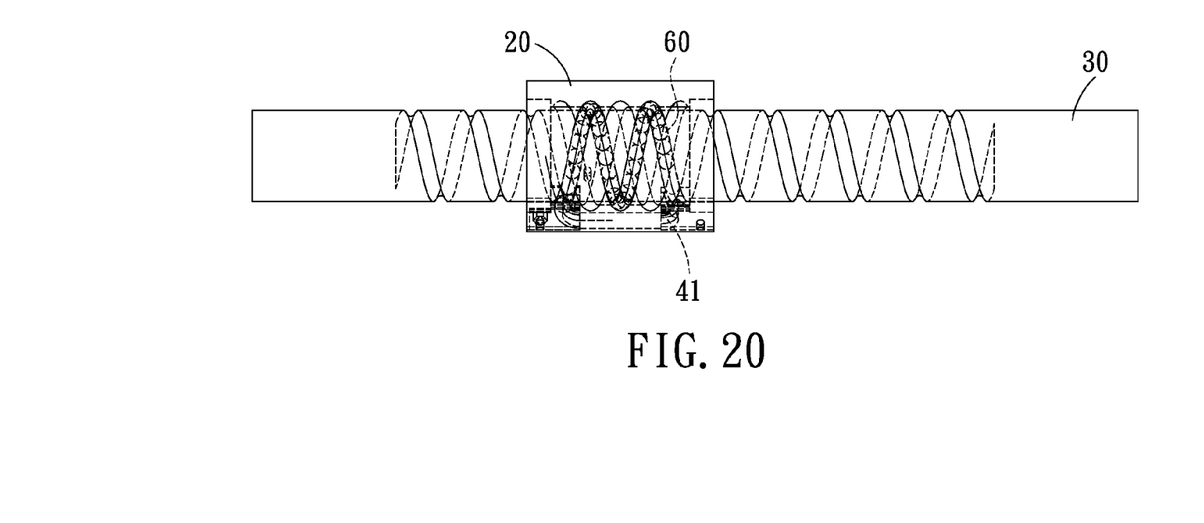
FIG. 20 is an assembly view of the ball screw with sectional circulating assemblies in accordance with the present invention, wherein the screw, nut, one of the circulating assemblies and the rolling balls have been assembled.
Figure 21:
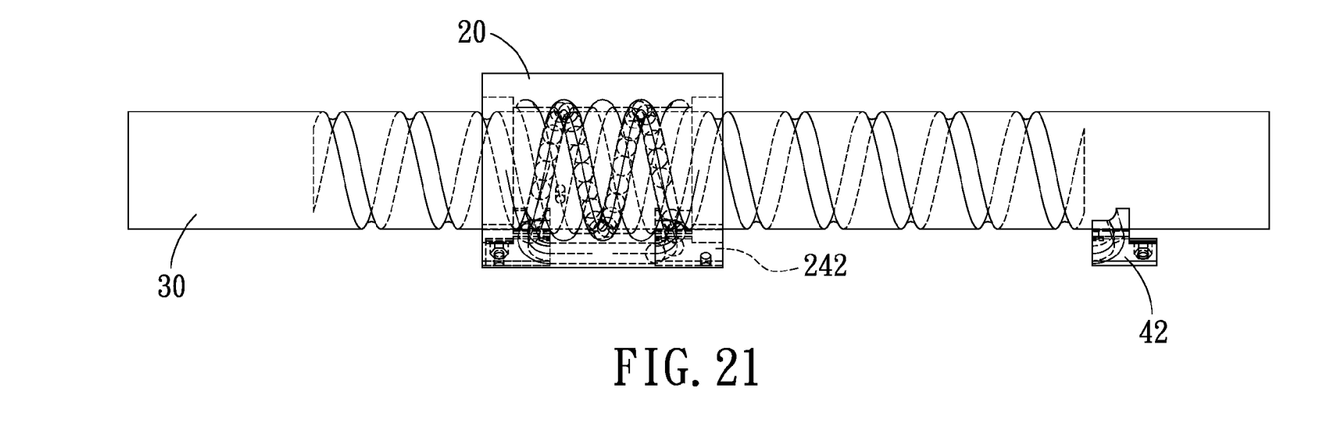
FIG. 21 is a perspective showing that the outer circulating block of another circulating assembly is being assembled in the ball screw in accordance with the present invention.
Figure 22:
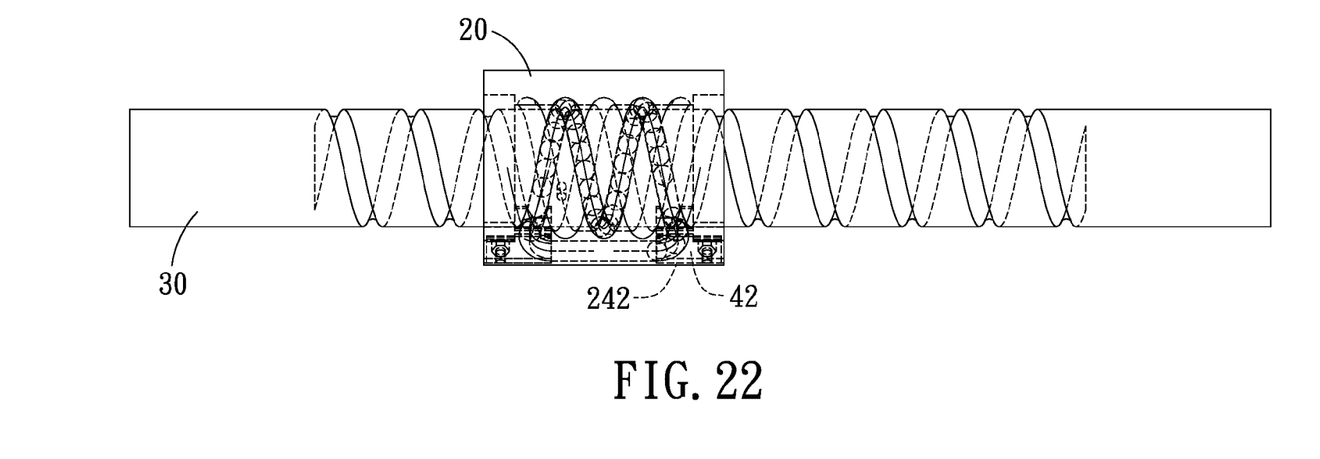
FIG. 22 is a perspective view showing that the ball screw with sectional circulating assemblies in accordance with the present invention, wherein the outer circulating block of another circulating assembly has been assembled in the ball screw.

As shown in FIGS. 4-13, in addition to the abovementioned structural features, the ball screw with sectional circulating assemblies in accordance with the present invention can give a remarkable effect only when assembled by following the following steps:

A, as shown in FIG. 16, inserting the screw shaft 30 through the inserting hole 25 of the nut 20 or sleeving the nut 20 onto the screw shaft 30, so as to form two assembling spaces 24 between the nut 20 and the screw shaft 30, and the two assembling spaces 24 include a first assembling space 241 and a second assembling space 242;

B, as shown in FIG. 17, inserting the nail portion 411 of one of the circulating assemblies 40 into the helical groove 302 of the screw shaft 30, and keeping the concerned circulating assembly 40 located at the outer peripheral surface of the screw shaft 30, then moving the nut 20 in the axial direction X until the concerned circulating assembly 40 gets into the first assembling space 241;

C, as shown in FIG. 18, moving the inner circulating block 41 another one of the circulating assemblies 40 along the axial direction X into the second assembling space 242, at this moment, the nail portion 411 of the inner circulating block 41 is located toward the outer peripheral surface of the screw shaft 30, then moving the inner circulating block 41 in the radial direction R to make the nail portion 411 insert into the helical groove 302 of the screw shaft 30, and make the first half guideway 414 of the nail portion 411 has one end connected to the circulating hole 21 of the nut 20;

D, as shown in FIGS. 19 and 20, feeding the rolling balls 60 into the circulating hole 21 until the load path is full of rolling balls 60; and E, as shown in FIGS. 21 and 22, moving the outer circulating block 42 of the another one of the circulating assemblies 40 in the axial direction X until it insert into the second assembling space 242, pushing the first fixing portion 423 in the axial direction X until it insert in the second fixing portion 412 of the inner circulating block 41, another end of the first half guideway 414 is overlapped with one end of each of the second half guideways 425 to form a circulating passage.

In assembly, the screw shaft 30 is initially inserted in the nut 20, a space is defined between the helical groove 302 of the screw shaft 30 and the helical groove 22 of the nut 20 to accommodate the rolling balls 60. After that, the inner circulating block 41 is inserted in the recess 23 and then slightly moves in the radial direction to make the nail portion 411 avoid interference with the screw shaft 30. Then, the inner circulating block 41 is pushed axially to a predetermined position in the helical groove 22 of the nut 20 and finally is pushed into place by being pushed in the radial direction. At this moment, the first half guideway 414 of the inner circulating block 41 cooperates with the second half guideway 425 of the outer circulating block 42 to form a complete circulating passage for connecting the helical groove 22 of the nut 20 to the circulating hole 21.

And then, the rolling balls 60 are fed into the circulating hole 21, after that, the outer circulating block 42 is pushed into the recess 23 to engage in the helical groove 22 of the nut 20 in such a manner that the first fixing portion 423 of the outer circulating block 42 is engaged with the second fixing portion 412 of the inner circulating block 41.

Finally, the locking member (not shown) is inserted through the locking hole 424 of the protruding ear 422 and locked in the nut 20, so that the circulating assembly 40 is positioned in the recess 23 of the nut 20 stably. By following the above steps can prevent the rolling balls from dropping out and interfering with the threads.

It is more important that since the inner and outer circulating blocks 41, 42 of the circulating assembly 40 are installed into the recess 23 of the nut 20 separately, the nail portion 411 will not interfere with the screw shaft 30, and the inner circulating block 41 can enter the space between the screw shaft 30 and the nut 20 more easily. Hence, it is unnecessary to define a notch in the shoulder portion of the screw shaft 30, the disadvantages of the prior art can be overcome, and the application range of the ball screw of the present invention is broadened.

On the other hand, since the inner and outer circulating blocks 41, 42 of the circulating assembly 40 are installed into the recess 23 of the nut 20 separately, it doesn't require any radial holes to be formed to avoid the interference of the nail portion. The locking hole 424 allows the protruding ear 422 to be firmly secured to the nut 20 and can maintain the tightness of the nut 20, preventing the leakage of noise.

To summarize, the sectional circulating assembly for a ball screw in accordance with the present invention comprises an inner circulating block and an outer circulating block. In assembly, the inner circulating block is initially placed between the screw shaft and the nut before the rolling balls and the screw shaft are positioned, thus preventing the rolling balls from dropping out and interfering with the threads. After the rolling balls and the screw shaft are positioned, the outer circulating block is placed into the nut and engaged with the inner circulating block, and the outer circulating block is fixed to the nut. Therefore, it can maintain the tightness of the nut while preventing the leakage of noise.

While we have shown and described various embodiments in accordance with the present invention, it is clear to those skilled in the art that further embodiments may be made without departing from the scope of the present invention.

What is claimed is:

1. A method for assembling a ball screw with sectional circulating assemblies comprising the following steps:
   inserting a screw shaft through an inserting hole of a nut or sleeving the nut onto the screw shaft, so as to form two assembling spaces between the nut and the screw shaft, and the two assembling spaces include a first assembling space and a second assembling space;
   inserting a nail portion of a first one of the circulating assemblies into a helical groove of the screw shaft, and keeping the concerned circulating assembly located at an outer peripheral surface of the screw shaft, then moving the nut in an axial direction until the first one of the circulating assemblies gets into the first assembling space;
   moving an inner circulating block a second one of the circulating assemblies along the axial direction into the second assembling space, at this moment, the nail portion of the inner circulating block of the second one of the circulating assemblies is located toward the outer peripheral surface of the screw shaft, then moving the inner circulating block of the second one of the circulating assemblies in a radial direction to make the nail portion insert into the helical groove of the screw shaft, and make a first half guideway of the nail portion has the one end connected to the circulating hole of the nut;
   feeding rolling balls into the circulating hole until a load path is full of the rolling balls; and
   moving an outer circulating block of the second one of the circulating assemblies in the axial direction until it inserts into the second assembling space, pushing a first fixing portion of the second one of the circulating assemblies in the axial direction until it inserts in a second fixing portion of the inner circulating block of the second one of the circulating assemblies, the another end of the first half guideway of the first one of the circulating assemblies is overlapped with the end of the second half guideway of the first one of the circulating assemblies, and the another end of the first half guideway of the second one of the circulating assemblies is overlapped with the end of the second half guideway of the second one of the circulating assemblies.

* * * * *